United States Patent [19]

Traunmüller

[11] 4,025,732

[45] May 24, 1977

[54] METHOD AND DEVICE FOR PRESENTING INFORMATION TO DEAF PERSONS

[76] Inventor: Hartmut Traunmüller, 123 Bjornstigen, Solna, Sweden, S-171 72

[22] Filed: July 22, 1976

[21] Appl. No.: 707,662

[30] Foreign Application Priority Data

Aug. 4, 1975 Sweden .............................. 7508760

[52] U.S. Cl. ....................................... 179/107 FD
[51] Int. Cl.² ...................................... H04R 25/00
[58] Field of Search ... 179/107 R, 107 BC, 107 FD

[56] References Cited

OTHER PUBLICATIONS

"The Intelligibility of Speech Transposed Downward in Frequency by One Octave", I.B. Thomas et al., Journal of the Audio Engineering Society, Feb. 1970, vol. 18, No. 1, pp. 56–61.

*Primary Examiner*—George G. Stellar

[57] ABSTRACT

In a device for presenting information to deaf persons an electroacoustic signal from a microphone is supplied to a high-pass and to a low-pass channel via an amplifier. The relation between the envelope potentials of the high-passed and the low-passed signals is sensed by means of logarithmic circuits and a differential amplifier, the output potential of which determines the frequency of a voltage controlled oscillator. By means of a dynamic-adapting signal, derived from the electroacoustic signal, an amplitude modulation of the oscillator output is provided. The accordingly obtained amplitude modulated signal is used to drive tactile or auditive transducers.

4 Claims, 2 Drawing Figures

METHOD AND DEVICE FOR PRESENTING INFORMATION TO DEAF PERSONS

The invention relates to a method for presenting information obtained from an electroacoustic signal, especially a speech signal, via tactile or auditive transducers, and to a device for carrying out the method, intended to be used by deaf persons, and presenting such information, which is suitable as a complement to lipreading.

Deaf persons without or with only insignificant residual hearing do not get any essential help by using hearing-aids. They are for speech perception constrained to use lip-reading. However, only lipreading does not make a full understanding of speech possible. Different ways of making further information in the speech available at a simultaneous lipreading have been known.

A simple method consists in driving a tactile transducer (vibrator) directly with an amplified electroacoustic signal. The vibrator can be sensed by the deaf person for instance with the fingers or via the teeth. The additional information, perceptible in this way, does, however, still not make a full understanding of speech possible.

More additional information can be made available by dividing the frequency spectrum of the speech into a number of bands and by controlling separate vibrators by means of the energy of each band. Each vibrator is for example sensed by one finger. (Report No. 27, March 1963, Speech Transmission Laboratory, Royal Institute of Technology, Stockholm.) Said method, however, is not optimally adapted to the need of additional information and the limited perception capacity of the tactile sense.

Another aid presents by means of a number of lamps, which can be seen around the mouth of the speaker, the spectral position of the energy center of the speech spectrum (STL-QPSR 4/1974, p. 18–29, Speech Transmission Laboratory, Royal Institute of Technology, Stockholm). Thereby, a better adaptation to the need for additional information is obtained, However, it has not proved to be possible in this way to avail oneself of all the information observable.

A method which, however, only can be used by persons, which have usable residual hearing in certain frequency regions, consists in the transposition of other frequencies to said region. Usually higher frequencies than 4 kHz are transposed towards lower frequencies, (SwedishPat. No. 213,607.)

The object of the invention is to find a simple method to present additional information well adapted to lipreading so that deaf persons can avail oneself thereof. This object is solved through the invention by a method for presenting information obtained from an electroacoustic signal by means of bandfilters and a following signal treatment to deaf persons via at least one tactile or auditive transducer, in which the relation between two signals corresponding to envelope potentials is derived, said signals being obtained from the electroacoustic signal by means of band filters with different frequency responses, and a signal corresponding to said relation being brought to continuously control the frequency of an oscillator, the output signal of which being amplitude modulated with a dynamic-adapting potential obtained from said electroacoustic signal and being used to drive at least one tactile or auditive transducer.

Figure 1:
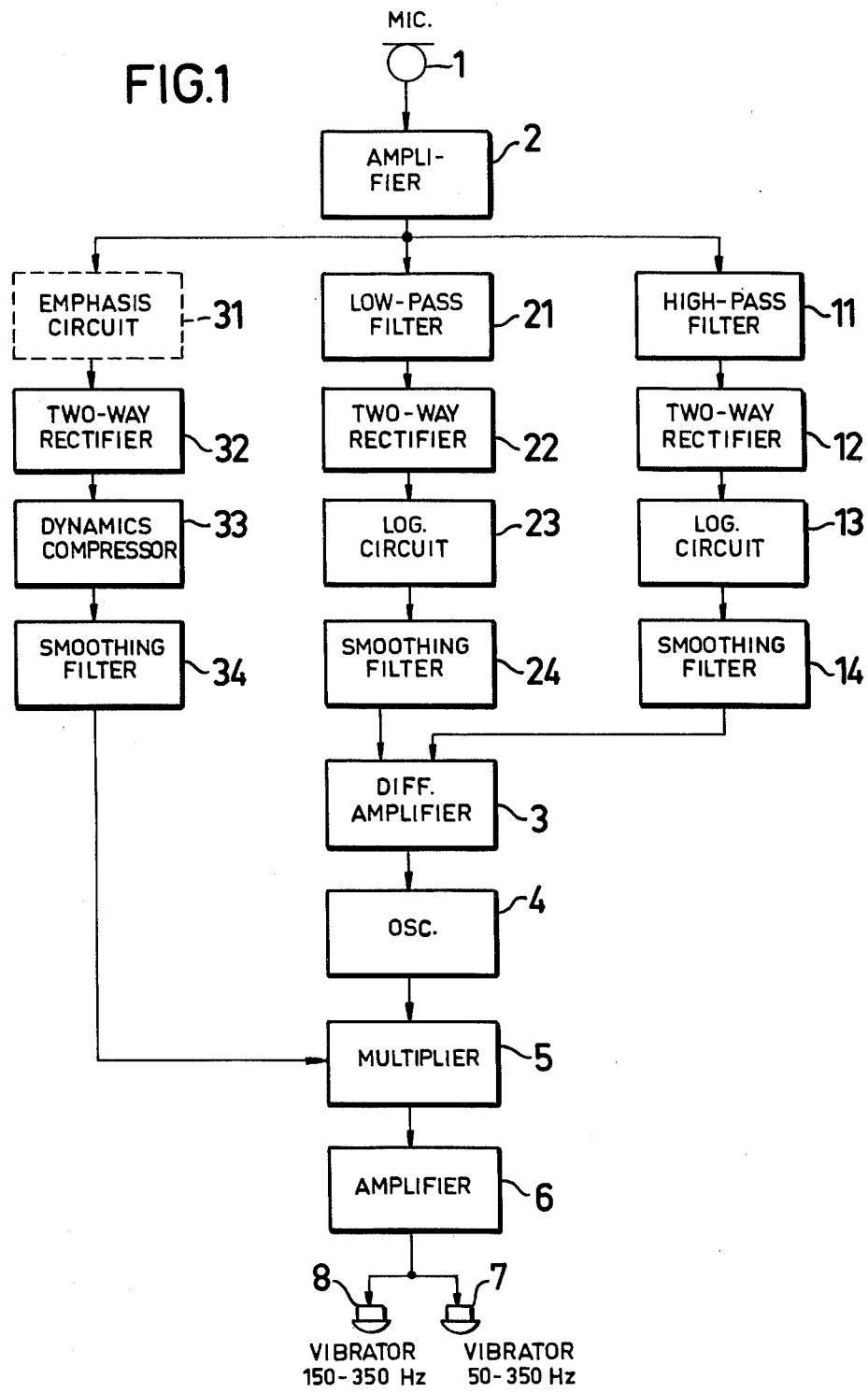
FIG. 1 shows the schematic block diagram of an embodiment which is described hereinafter.
Figure 2:
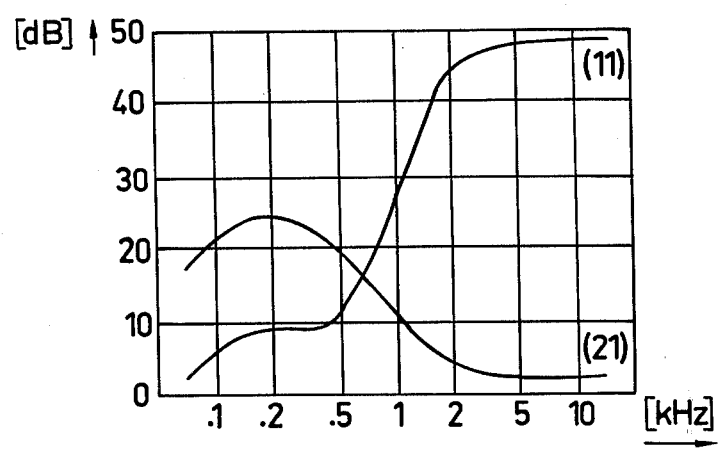
FIG. 2 shows the frequency responses of a high-pass filter and a low-pass filter.

The electroacoustic signal which here comes from a microphone 1 via an amplifier 2 is supplied to a high-pass and a low-pass channel comprising high-pass filter 11 and low-pass filter 21, respectively, with frequency responses according to FIG. 2. Since the average energy in the speech spectra above 600 Hz drops towards higher frequencies, it is necessary to emphasize the high-pass signal relative to the low-pass signal. The approximate parallel course of the two frequency responses below 200 Hz serves to reduce the difference between the result from male, female and children's voices. The signal in each channel is rectified with linear two-way rectifiers 12 and 22, whereafter it is made logarithmic within the essential dynamic range by means of logarithmic circuits 13 and 23. The purpose of the logarithmic transformation is to enable the forming of a value of the relation between the intensities of the high-pass and the low pass signal. This takes place after integration over a time which corresponds to the integration time of the ear with smmothing filters 14 and 24, by forming the difference between the potentials of the signals by means of a differential amplifier 3.

The potential from the differential amplifier 3 determines the frequency of a voltage controlled oscillator 4, the lowest possible frequency of which through a bias circuit is limited to about 50 Hz.

The electroacoustic signal from the amplifier 2 is supplied to a further channel, in which it is rectified by a linear two-way rectifier 32. Connected thereto is a dynamics compressor 33. Said compressor comprises a logarithmic circuit, a voltage divider and a following anti-logarithmic circuit. The voltage divider is dimensioned to halve the voltage, so that the output signal obtains a potential proportional to the square root of the potential of the input signal. The compressed signal passes a smoothing filter 34 and is supplied to a multiplier 5, the second input signal of which represents the oscillation produced by the oscillator 4. The output signal from the multiplier 5 thus obtained has a frequency which is approximately proportional to the spectral position of the energy centre of the speech spectrum, measured with auditory measures for intensities and frequencies. This type of information is well adapted as a complement to lipreading. The amplitude of the signal is proportional to the square root of the amplitude of the microphone signal. Thereby an adaptation to the dynamics of the tactile sense or of residual hearing is obtained.

The signal from the multiplier 5 is supplied to an amplifier 6, feeding one or more transducers. In one embodiment a vibrator 7 is used to be held against the temple or any other part of the body, where a good contact with the skeleton is possible. The frequency response of the vibrator shows a decrease of about 6 dB per octave from 50 Hz and upwards. A further vibrator 8 to be sensed by on or two fingers, with a frequency response from about 150 Hz to at least 350 Hz, can be used. Thereby the separation of different vibration frequencies is facilitated by a variation in intensity between two stimulus locations.

The ability of separating different stimulus locations can be utilized in a higher degree by use of more vibrators each one with a pronounced resonance at a separate frequency. Instead of tactile tansducers also acoustic tansducers can be used. The dynamics and frequency variation of the signal can be assigned to a desired range, for instance adapted to the residual hearing of a deaf person. An emphasis circuit 31 shown with dashed lines can be used for balancing the experience of intensity at different oscillator frequencies. If residual hearing a low frequencies exists, an above mentioned vibrator 7 can supply information both in a tactile and also in an auditive manner by bone conduction.

I claim:

1. A method for presenting information obtained from an electroacoustic signal by means of bandfilters and a following signal treatment to deaf persons, via at least one tactile or auditive transducer, in which the relation between two signals corresponding to envelope potentials is derived, said signals being obtained from the electroacoustic signal by means of band filters with different frequency responses, and a signal corresponding to said relation being brought to continuously control the frequency of an oscillator, the ouput signal of which being amplitude modulated with a dynamic-adapting potential obtained from said electroacoustic signal and being used to drive at least one tactile or auditive transducer.

2. A method according to claim 1, in which the amplitude of the signal which is used to drive said at least one transducer is controlled by the envelope-potential of a signal obtained from said electroacoustic signal after dynamics compression and possible emphasis in predetermined frequency ranges.

3. A device for carrying out a method for presenting information obtained from an electroacoustic signal by means of bandfilters and a following signal treatment to deaf persons via at least one tactile or auditive transducer, comprising a multiplier, from which the signal driving said at least one transducer is obtained after a possible amplification in an amplifier; an oscillator connected to one input of the multiplier, the frequency of said oscillator being controlled by a potential obtained from a differential amplifier; and two channels connected to said differential amplifier, one channel of which containing a high-pass filter and the other channel a low-pass filter, both said filters being supplied with the same electroacoustic signal and connected to a respective rectifier, a logarithmic circuit and a smoothing filter being connected downstream of each rectifier, said electroacoustic signal also feeding a circuit for derivation of a dynamic-adapting signal which is supplied to a second input of said multiplier.

4. Device according to claim 3, in which the circuit for deriving said dynamic-adapting signal which is supplied to the second input of the multiplier comprises a rectifier, a dynamics compressor and a smoothing filter, supplied with the electroacoustic signal after possible emphasis in predetermined frequency ranges.

* * * * *